US012008981B2

(12) United States Patent
Nakahara et al.

(10) Patent No.: US 12,008,981 B2
(45) Date of Patent: Jun. 11, 2024

(54) SOUND-ABSORBING MATERIAL NONWOVEN FABRIC, SOUND-ABSORBING MATERIAL, AND METHOD FOR PRODUCING SOUND-ABSORBING MATERIAL NONWOVEN FABRIC

(71) Applicant: Toray Industries, Inc., Tokyo (JP)

(72) Inventors: Makoto Nakahara, Otsu (JP); Hiroshi Kajiyama, Otsu (JP)

(73) Assignee: Toray Industries, Inc., Tokyo (JP)

( * ) Notice: Subject to any disclaimer, the term of this patent is extended or adjusted under 35 U.S.C. 154(b) by 406 days.

(21) Appl. No.: 17/435,174

(22) PCT Filed: Mar. 2, 2020

(86) PCT No.: PCT/JP2020/008766

§ 371 (c)(1),
(2) Date: Aug. 31, 2021

(87) PCT Pub. No.: WO2020/179753

PCT Pub. Date: Sep. 10, 2020

(65) Prior Publication Data

US 2022/0148551 A1 May 12, 2022

(30) Foreign Application Priority Data

Mar. 7, 2019 (JP) ................................ 2019-041292

(51) Int. Cl.

| | |
|---|---|
| ***G10K 11/162*** | (2006.01) |
| ***D04H 1/43*** | (2012.01) |
| ***D04H 1/435*** | (2012.01) |
| ***D04H 1/492*** | (2012.01) |
| ***D04H 13/00*** | (2006.01) |
| ***G10K 11/168*** | (2006.01) |

(52) U.S. Cl.

CPC ............ *G10K 11/168* (2013.01); *D04H 1/43* (2013.01); *D04H 1/435* (2013.01); *D04H 1/492* (2013.01); *D04H 13/00* (2013.01); *D10B 2401/063* (2013.01); *G10K 2210/3223* (2013.01)

(58) Field of Classification Search

CPC .... G10K 11/162; G10K 11/168; G10K 11/16; G10K 2210/3223; B32B 5/26; B32B 5/24; B32B 5/22; D04H 1/435; D04H 1/4382; D04H 1/492; D04H 1/74; D04H 1/43835; D04H 1/4326; D04H 1/43; D04H 13/00; D04H 13/001; D10B 2401/063

See application file for complete search history.

(56) References Cited

U.S. PATENT DOCUMENTS

| | | | | |
|---|---|---|---|---|
| 5,733,625 | A * | 3/1998 | Tsuchiya | D04H 1/74 442/352 |
| 9,279,202 | B2 * | 3/2016 | Matsumura | D01G 15/00 |
| 10,789,931 | B2 | 9/2020 | Weik et al. | |
| 10,825,439 | B2 | 11/2020 | Weik et al. | |
| 11,015,272 | B2 | 5/2021 | Kajiyama et al. | |
| 2010/0086738 | A1 | 4/2010 | Tanaka et al. | |
| 2010/0088738 | A1 | 4/2010 | Tanaka et al. | |
| 2017/0044699 | A1 | 2/2017 | Kurashima et al. | |
| 2018/0051403 | A1 | 2/2018 | Kajiyama et al. | |
| 2018/0268800 | A1 | 9/2018 | Weik et al. | |
| 2018/0268801 | A1 | 9/2018 | Weik et al. | |
| 2019/0156810 | A1 | 5/2019 | Inagaki | |

FOREIGN PATENT DOCUMENTS

| | | | | |
|---|---|---|---|---|
| CN | 101379236 | A | 3/2009 | |
| CN | 101652515 | A | 2/2010 | |
| CN | 102627010 | A | 8/2012 | |
| CN | 104441876 | A | 3/2015 | |
| CN | 107429456 | A | 12/2017 | |
| CN | 108621974 | A | 10/2018 | |
| DE | 202009011197 | U1 * | 12/2009 | D04H 1/4291 |
| EP | 2484826 | A1 | 8/2012 | |
| EP | 3246442 | A1 * | 11/2017 | B32B 27/08 |
| EP | 4253037 | A1 * | 10/2023 | B32B 27/36 |
| JP | 2001228879 | A | 8/2001 | |
| JP | 2001316964 | A * | 11/2001 | |
| JP | 2008290642 | A | 12/2008 | |
| JP | 2008290642 | A * | 12/2008 | |
| JP | 2013096014 | A * | 5/2013 | |
| JP | 2013154583 | A | 8/2013 | |
| JP | 2014081638 | A | 5/2014 | |
| JP | 2015030218 | A * | 2/2015 | |
| JP | 2015121631 | A | 7/2015 | |

(Continued)

OTHER PUBLICATIONS

Chinese Office Action with Search Report for Chinese Application No. 202080018631.X, issued Sep. 6, 2023 with translation, 16 pages.

(Continued)

*Primary Examiner* — Edgardo San Martin

(74) *Attorney, Agent, or Firm* — Buchanan Ingersoll & Rooney PC

(57) ABSTRACT

A sound-absorbing material nonwoven fabric includes: 30 to 80 mass % of short fibers A having a fineness of 0.4 to 0.9 dtex; and 20 to 70 mass % of short fibers B having a fineness of 1.1 to 20.0 dtex. A carding passage coefficient of the short fibers A calculated from equation (1) is in a range of 15 to 260. The equation (1) is carding passage coefficient=(fineness×strength×√elongation percentage×√number of crimps×√crimping degree)/(fiber length).

11 Claims, No Drawings

(56) References Cited

FOREIGN PATENT DOCUMENTS

| | | | | | |
|---|---|---|---|---|---|
| JP | 2015196933 | A | | 11/2015 | |
| JP | 2016034828 | A | | 3/2016 | |
| JP | 6191320 | B2 | | 9/2017 | |
| JP | 2018017994 | A | | 2/2018 | |
| JP | 2018154113 | A | | 10/2018 | |
| JP | 2020020856 | A | * | 2/2020 | |
| JP | 2009184296 | A | | 8/2020 | |
| WO | 2016143857 | A1 | | 9/2016 | |
| WO | 2018021319 | A1 | | 2/2018 | |
| WO | WO-2020179753 | A1 | * | 9/2020 | ............... D04H 1/43 |

OTHER PUBLICATIONS

Indian Examination Report for Indian Application No. 202147039137, dated Feb. 3, 2023 with translation, 5 pages.

Extended European Search Report for European Application No. 20 767 015.9, dated Oct. 12, 2022, 12 pages.

International Search Report and Written Opinion for International Application PCT/JP2020/008766, dated Apr. 14, 2020, 5 pages.

* cited by examiner

SOUND-ABSORBING MATERIAL NONWOVEN FABRIC, SOUND-ABSORBING MATERIAL, AND METHOD FOR PRODUCING SOUND-ABSORBING MATERIAL NONWOVEN FABRIC

CROSS REFERENCE TO RELATED APPLICATIONS

This is the U.S. National Phase application of PCT/JP2020/008766, filed Mar. 2, 2020, which claims priority to Japanese Patent Application No. 2019-041292, filed Mar. 7, 2019, the disclosures of each of these applications being incorporated herein by reference in their entireties for all purposes.

FIELD OF THE INVENTION

The present invention relates to a sound-absorbing material nonwoven fabric, a sound-absorbing material, and a method for producing a sound-absorbing material nonwoven fabric.

BACKGROUND OF THE INVENTION

In recent years, quietness has become one of the commercial values of products such as automobiles and electrical appliances and is being increasingly valued more than ever. A general approach that is considered effective to control noise is to increase the mass and thickness of a sound-absorbing material serving as a countermeasure component. To ensure large spaces in automobile cabins and residential rooms and also from the point of view of automobile fuel efficiency, more lightweight and more compact sound-absorbing materials are demanded. In the automobile field, another requirement is heat resistance allowing the materials to be applied around engines or the like.

Patent Literature 1 proposes a sound-absorbing laminated nonwoven fabric having excellent sound absorbing properties. This laminated nonwoven fabric has a layer made of nanofibers and a layer made of polyethylene terephthalate short fibers.

Furthermore, Patent Literature 2 proposes a method for producing a vehicle soundproofing material in which an airflow control film is formed by heating and pressing one side of a substrate sheet that includes ultrafine fibers having a fineness of 0.1 to 1.0 dtex and short fibers having a fineness of 1.2 to 5.0 dtex.

PATENT LITERATURE

Patent Literature 1: WO 2016/143857

Patent Literature 2: Japanese Patent Application Laid-open No. 2016-34828

SUMMARY OF THE INVENTION

According to the knowledge of the present inventors, the sound-absorbing laminated nonwoven fabric disclosed in Patent Literature 1 and the vehicle soundproofing material disclosed in Patent Literature 2 (hereinafter, collectively referred to as sound-absorbing material nonwoven fabrics) each include ultrafine fibers and thus tend to be relatively good in soundproofing performance.

However, these sound-absorbing material nonwoven fabrics are produced through a step in which fibers including ultrafine fibers are opened with a carding machine or a fleecing machine (hereinafter, the carding step). At the carding step, the ultrafine fibers tend to be broken or to be caught in the card clothing more easily than fibers having a relatively large fineness. Due to this, the sound-absorbing material nonwoven fabrics using ultrafine fibers have a drawback in that their productivity is low. Furthermore, such sound-absorbing material nonwoven fabrics tend to contain broken ultrafine fibers present inside as fiber clumps. In this case, sound-absorbing materials using such sound-absorbing material nonwoven fabrics are poor in sound absorption performance and also the quality of the sound-absorbing materials is impaired.

Furthermore, in an embodiment of Patent Literature 1, a method is described for the production of the sound-absorbing laminated nonwoven fabric of Patent Literature 1. This production method includes steps in which fibers including polymer alloy matrix-domain fibers are opened with a carding machine and are entangled in this order to form a nonwoven fabric, and the nonwoven fabric is treated with a 1% aqueous sodium hydroxide solution at a high temperature to remove the matrix. In this production method, ultrafine fibers appear in the nonwoven fabric only after the matrix removal treatment. The fiber opening treatment takes place in the absence of ultrafine fibers in the nonwoven fabric but in the presence of matrix-domain fibers that significantly differ from ultrafine fibers in fiber diameter and the like. Thus, in this method for producing the sound-absorbing laminated nonwoven fabric of Patent Literature 1, the fibers are unlikely to be broken during the carding step for reasons such as because the matrix-domain fibers have a large fiber diameter. This production method, however, necessarily involves a matrix removal step in which ultrafine fibers are obtained from the matrix-domain fibers after the fibers have been formed into a nonwoven fabric. Thus, the sound-absorbing laminated nonwoven fabric of Patent Literature 1 has a drawback in that the productivity is low as compared to when a sound-absorbing material nonwoven fabric is obtained without the matrix removal treatment.

Thus, in view of the circumstances discussed above, objects of the present invention are to provide a sound-absorbing material nonwoven fabric and a sound-absorbing material that each exhibit excellent sound absorption performance in a low frequency region and a high frequency region and are also excellent in productivity and quality, and to provide a method for producing such a sound-absorbing material nonwoven fabric.

To solve the problem described above, the present invention according to exemplary embodiments includes the following configuration.

(1) A sound-absorbing material nonwoven fabric comprising: 30 to 80 mass % of short fibers A having a fineness of 0.4 to 0.9 dtex; and 20 to 70 mass % of short fibers B having a fineness of 1.1 to 20.0 dtex, a carding passage coefficient of the short fibers A calculated from following equation (1) being in a range of 15 to 260, $$\text{carding passage coefficient} = \frac{\left(\text{fineness} \times \text{strength} \times \sqrt[2]{\text{elongation percentage} \times \text{number of crimps} \times \text{crimping degree}}\right)}{(\text{fiber length})} \quad (1)$$

wherein fineness, strength, elongation percentage, number of crimps, crimping degree, and fiber length in the equation (1) are measured in the units of dtex, cN/dtex, %, peaks/25 mm, %, and cm, respectively.

(2) The sound-absorbing material nonwoven fabric according to (1), wherein a basis weight of the sound-absorbing material nonwoven fabric is not less than 150 $g/m^2$ and not more than 500 $g/m^2$, and a thickness of the sound-absorbing material nonwoven fabric is not less than 0.6 mm and not more than 4.0 mm.

(3) The sound-absorbing material nonwoven fabric according to (1) or (2), wherein a density of the sound-absorbing material nonwoven fabric is not less than 0.07 $g/cm^3$ and not more than 0.40 $g/cm^3$.

(4) The sound-absorbing material nonwoven fabric according to any one of (1) to (3), wherein the short fibers A are acrylic short fibers or polyester short fibers.

(5) The sound-absorbing material nonwoven fabric according to any one of (1) to (4), wherein the short fibers A are acrylic short fibers.

(6) The sound-absorbing material nonwoven fabric according to any one of (1) to (5), wherein a L value in the L*a*b* color system is not more than 70.

(7) The sound-absorbing material nonwoven fabric according to any one of (1) to (6), wherein a tensile strength of the short fibers A is not less than 5 cN/dtex, and a tensile elongation percentage of the short fibers A is 20 to 35%.

(8) The sound-absorbing material nonwoven fabric according to any one of (1) to (7), wherein the fineness of the short fibers A is 0.4 to 0.9 dtex, the fineness of the short fibers B is 1.1 to 1.8 dtex, and a ratio of the fineness of the short fibers A to the fineness of the short fibers B (fineness of the short fibers A/fineness of the short fibers B) is 0.30 to 0.60.

(9) A sound-absorbing material comprising: the sound-absorbing material nonwoven fabric according to any one of (1) to (8); and a fiber porous body, a foam, or an air layer having a thickness of 5 to 50 mm and disposed on a side of the sound-absorbing material nonwoven fabric opposite to a side on which sound enters.

(10) A method for producing a sound-absorbing material nonwoven fabric, the method comprising:

a step of opening short fibers A and short fibers B and obtaining a mixed fiber web comprising the short fibers A and the short fibers B; and a step of passing the mixed fiber web through a water jet punching nozzle three or more times, the short fibers A having a fineness of 0.4 to 0.9 dtex and a carding passage coefficient calculated from equation (1) below in a range of 15 to 260, the short fibers B having a fineness of 1.1 to 20.0 dtex, a content of the short fibers A being 30 to 80 mass % and a content of the short fibers B being 20 to 70 mass % of the whole of the mixed fiber web, $$\text{carding passage coefficient} = \frac{\left(\text{fineness} \times \text{strength} \times \sqrt[2]{\text{elongation percentage} \times \text{number of crimps} \times \text{crimping degree}}\right)}{(\text{fiber length})} \quad (1)$$

wherein fineness, strength, elongation percentage, number of crimps, crimping degree, and fiber length in the equation (1) are measured in the units of dtex, cN/dtex, %, peaks/25 mm, %, and cm, respectively.

(11) A method for producing a sound-absorbing material nonwoven fabric, the method comprising:

a step of opening short fibers A and short fibers B and obtaining a mixed fiber web comprising the short fibers A and the short fibers B; and a step of needle punching the mixed fiber web with a needle density of not less than 200 needles/$cm^2$, the short fibers A having a fineness of 0.4 to 0.9 dtex and a carding passage coefficient calculated from equation (1) below in a range of 15 to 260, the short fibers B having a fineness of 1.1 to 20.0 dtex, a content of the short fibers A being 30 to 80 mass % and a content of the short fibers B being 20 to 70 mass % of the whole of the mixed fiber web, $$\text{carding passage coefficient} = \frac{\left(\text{fineness} \times \text{strength} \times \sqrt[2]{\text{elongation percentage} \times \text{number of crimps} \times \text{crimping degree}}\right)}{(\text{fiber length})} \quad (1)$$

wherein fineness, strength, elongation percentage, number of crimps, crimping degree, and fiber length in the equation (1) are measured in the units of dtex, cN/dtex, %, peaks/25 mm, %, and cm, respectively.

The sound-absorbing material nonwoven fabric provided according to embodiments of the present invention includes ultrafine fibers having predetermined properties and thereby exhibits excellent sound absorption performance in a low frequency region and a high frequency region and also attains excellent productivity and excellent quality.

DETAILED DESCRIPTION OF EMBODIMENTS OF THE INVENTION

Embodiments of the present invention will be described in detail hereinbelow.

A sound-absorbing material nonwoven fabric according to an embodiment of the present invention includes 30 to 80 mass % of short fibers A having a fineness of 0.4 to 0.9 dtex and 20 to 70 mass % of short fibers B having a fineness of 1.1 to 20.0 dtex. The carding passage coefficient of the short fibers A calculated from the following equation (1) is in the range of 15 to 260.

$$\text{carding passage coefficient} = \frac{\left(\text{fineness} \times \text{strength} \times \sqrt[2]{\text{elongation percentage} \times \text{number of crimps} \times \text{crimping degree}}\right)}{(\text{fiber length})} \quad (1)$$

wherein fineness, strength, elongation percentage, number of crimps, crimping degree, and fiber length in the equation (1) are measured in the units of dtex, cN/dtex, %, peaks/25 mm, %, and cm, respectively.

The above sound-absorbing material nonwoven fabric (hereinafter, also simply referred to as the "nonwoven fabric") is producible with reduced probability of the short fibers A being broken or with reduced probability of the short fibers A being caught in card clothing during a carding step using a carding machine or the like. The reduced probability of the short fibers A being broken or of the short fibers A being caught in card clothing leads to excellent productivity of the sound-absorbing material nonwoven fabric and also reduces the occurrence of broken short fibers A as fiber clumps inside the sound-absorbing material nonwoven fabric, thus allowing the sound-absorbing material nonwoven fabric to attain high sound absorption performance in both a low frequency region and a high frequency region. The present inventors have also found that the reduced occurrence of broken short fibers A as fiber clumps inside the sound-absorbing material nonwoven fabric effectively enhances the quality of the sound-absorbing material nonwoven fabric. Incidentally, these effects described above are sometimes collectively referred to as the "advantageous effects of the present invention". The above effects of the sound-absorbing material nonwoven fabric according to embodiments of the present invention probably stem from the carding passage coefficient of the short fibers A being in the range of 15 to 260.

The sound-absorbing material nonwoven fabric according to embodiments of the present invention is characterized (feature 1) by including the short fibers B having a fineness of 1.1 to 20.0 dtex in an amount of 20 to 70 mass % relative to the total mass of the sound-absorbing material nonwoven fabric. In the configuration of the sound-absorbing material nonwoven fabric according to embodiments of the present invention, the advantageous effects of the present invention may be obtained by virtue of the sound-absorbing material nonwoven fabric satisfying the above feature 1. As described hereinabove, the short fibers A having a smaller fineness tend to be easily broken, to be easily caught in card clothing and to easily form fiber clumps inside the sound-absorbing material nonwoven fabric during the carding step as compared to the short fibers B. In contrast, the short fibers B having a fineness of 1.1 to 20.0 dtex are less likely to be broken or caught and to form fiber clumps in the phenomena described above.

Probably for the reasons described above, the sound-absorbing material nonwoven fabric obtained so as to include 20 mass % or more of such short fibers B relative to the total mass of the sound-absorbing material nonwoven fabric attains a reduced frequency at which the fibers are broken or caught in the card clothing or form fiber clumps in the entirety of the sound-absorbing material nonwoven fabric, and consequently attains excellent productivity and quality. If, on the other hand, the content of the short fibers B constituting the sound-absorbing material nonwoven fabric is excessively high, porous portions of the sound-absorbing material nonwoven fabric are coarse and large, and the sound-absorbing material nonwoven fabric used as a sound-absorbing material tends to exhibit low sound absorption performance. Thus, the content of the short fibers B is not more than 70 mass % relative to the total mass of the sound-absorbing material nonwoven fabric. From the above viewpoint, the content of the short fibers B is preferably not less than 30 mass %, and more preferably not less than 35 mass %, and is preferably not more than 60 mass %, and more preferably not more than 55 mass % relative to the total mass of the sound-absorbing material nonwoven fabric.

Furthermore, the fineness of the short fibers B is 1.1 to 20.0 dtex. By limiting the fineness of the short fibers B to not more than 20.0 dtex, excellent sound absorbing properties may be obtained when used as a sound-absorbing material without inhibiting the formation of microporous portions by the short fibers A having a smaller fineness. On the other hand, as a result of the fineness of the short fibers B being limited to not less than 1.1 dtex, the short fibers A are uniformly dispersed inside the nonwoven fabric at the carding step and are unlikely to form clumps of the short fibers A inside the sound-absorbing material nonwoven fabric, and consequently the quality of the sound-absorbing material nonwoven fabric is enhanced. Furthermore, the short fibers A that are uniformly dispersed can form porous portions having a large number of micropores inside the sound-absorbing material nonwoven fabric, and the nonwoven fabric used as a sound-absorbing material attains excellent sound absorption performance. Furthermore, the short fibers A are prevented from being broken or being caught in the card clothing during the carding step, and consequently the productivity of the sound-absorbing material nonwoven fabric may be enhanced. From the above viewpoint, the fineness of the short fibers B is preferably 1.3 to 18.0 dtex, and more preferably 1.4 to 15.0 dtex.

Next, the sound-absorbing material nonwoven fabric according to an embodiment of the present invention is characterized (feature 2) in that the sound-absorbing material nonwoven fabric includes 30 to 80 mass % of the short fibers A having a fineness of 0.4 to 0.9 dtex, and the carding passage coefficient of the short fibers A calculated from the following equation (1) is in the range of 15 to 260.

$$\text{carding passage coefficient} = \frac{\left(\text{fineness} \times \text{strength} \times \sqrt[2]{\text{elongation percentage} \times \text{number of crimps} \times \text{crimping degree}}\right)}{(\text{fiber length})} \quad (1)$$

wherein fineness, strength, elongation percentage, number of crimps, crimping degree, and fiber length in the equation (1) are measured in the units of dtex, cN/dtex, %, peaks/25 mm, %, and cm, respectively.

The advantageous effects of the present invention may be obtained by virtue of the sound-absorbing material nonwoven fabric according to the present invention satisfying the feature 2. As described hereinabove, the short fibers A having a smaller fineness tend to be easily broken, to be easily caught in the card clothing and to easily form fiber clumps inside the sound-absorbing material nonwoven fabric during the carding step. However, even the short fibers A having a fineness of 0.4 to 0.9 dtex are prevented from problems such as fiber breakage during the carding step as long as the carding passage coefficient of the short fibers A is in the range of 15 to 260. Specifically, as a result of the short fibers A having a fineness of 0.4 to 0.9 dtex and a carding passage coefficient of 15 to 260, the sound-absorbing material nonwoven fabric can contain such short fibers A in a specific proportion by virtue of the reduced occurrence of problems such as the breakage of the short fibers A during the carding step, and the sound-absorbing material nonwoven fabric attains excellent productivity and allows a sound-absorbing material using the sound-absorbing material nonwoven fabric to achieve excellent sound absorption performance. The mechanism of this is probably as described below. By optimizing the balance between characteristics of the short fibers A, namely, between the fiber length and the fineness, strength, elongation percentage, number of crimps and crimping degree (that is, by controlling the carding passage coefficient of the short fibers A to 15 to 260), the short fibers A will be prevented from breakage due to the friction between the short fibers A and the card clothing during the carding step (in particular, probably largely because of the strength of the short fibers A and the elongation percentage of the short fibers A), and the short fibers A will be prevented from being caught in the card clothing during the carding step (in particular, probably largely because of the fiber length of the short fibers A). Furthermore, at the carding step, the short fibers A and the short fibers B are uniformly dispersed and entangled inside the nonwoven fabric, and the short fibers A are unlikely to form fiber clumps inside the sound-absorbing material nonwoven fabric (in particular, probably largely because of the number of crimps and the crimping degree of the short fibers A). Thus, the quality of the sound-absorbing material nonwoven fabric is enhanced. Furthermore, the short fibers A that are uniformly dispersed inside the nonwoven fabric can form porous portions having a large number of micropores inside the sound-absorbing material nonwoven fabric, and the nonwoven fabric allows a sound-absorbing material using the nonwoven fabric to achieve excellent sound absorption performance.

Furthermore, the carding passage coefficient of the short fibers A may be controlled as desired in consideration of all the fineness, strength, elongation percentage, number of crimps, crimping degree and fiber length of the short fibers A. For the reasons described above, the carding passage coefficient of the short fibers A is preferably not less than 20, and more preferably not less than 150, or is more preferably not less than 25, and still more preferably not less than 100.

The respective ranges of the fineness, strength, elongation percentage, number of crimps, crimping degree and fiber length of the short fibers A are preferably as described below, but are not particularly limited thereto as long as the carding passage coefficient falls in the range of 15 to 260.

The fineness of the short fibers A is 0.4 to 0.9 dtex. By limiting the fineness of the short fibers A to not more than 0.90 dtex, the short fibers A having a small fineness can form porous portions having a large number of micropores inside the sound-absorbing material nonwoven fabric. As a result, when sound passes through the voids between the fibers (that is, through the porous portions), the sound may be efficiently converted into heat by air friction with the fibers around the voids. Thus, the sound-absorbing material nonwoven fabric may attain excellent sound absorbing properties when used as a sound-absorbing material.

By limiting the fineness of the short fibers A to not less than 0.4 dtex, on the other hand, the short fibers A are uniformly dispersed inside the nonwoven fabric at the carding step, and the short fibers A are unlikely to form fiber clumps inside the sound-absorbing material nonwoven fabric. Thus, the quality of the sound-absorbing material nonwoven fabric is enhanced. Furthermore, the short fibers A that are uniformly dispersed inside the nonwoven fabric can form porous portions having a large number of micropores inside the sound-absorbing material nonwoven fabric, and the sound-absorbing material nonwoven fabric exhibits excellent sound absorption performance when used as a sound-absorbing material. From the above viewpoints, the fineness of the short fibers A is preferably 0.5 to 0.8 dtex, and more preferably 0.5 to 0.7 dtex. Production of ultrafine fibers having a fineness smaller than the range of 0.4 to 0.9 dtex requires a technique involving matrix removal from matrix-domain fibers or an electrospinning method, but these techniques have a drawback in that the productivity is low as compared to other methods for the production of short fibers or the like such as a melt spinning method or a wet spinning method. In the short fibers A used in the sound-absorbing material nonwoven fabric according to an embodiment of the present invention, the fineness is 0.4 to 0.9 dtex. Thus, the short fibers A may be produced by a melt spinning method or a wet spinning method. That is, the sound-absorbing material nonwoven fabric according to the present invention may be obtained without the need of a technique involving matrix removal from matrix-domain fibers or an electrospinning method. Thus, the productivity of the sound-absorbing material nonwoven fabric according to embodiments of the present invention is high as compared to the productivity of sound-absorbing material nonwoven fabrics that are necessarily produced using a technique involving matrix removal from matrix-domain fibers or an electrospinning method.

In order to further increase the sound absorbing properties of the sound-absorbing material nonwoven fabric, it is preferable that short fibers A having a fineness of 0.4 to 0.9 dtex and short fibers B having a fineness of 1.1 to 1.8 dtex be used, and the ratio of the fineness of the short fibers A to the fineness of the short fibers B (fineness of the short fibers A/fineness of the short fibers B) be 0.30 to 0.60. By limiting the fineness of the short fibers A and the short fibers B to the above ranges, the short fibers A having a smaller fineness and the short fibers B having a fineness that is larger than that of the short fibers A but is relatively small can form porous portions having a large number of micropores inside the sound-absorbing material nonwoven fabric, and consequently a sound-absorbing material having particularly excellent sound absorbing properties may be obtained.

Furthermore, by limiting the ratio of the fineness of the short fibers A to the fineness of the short fibers B (fineness of the short fibers A/fineness of the short fibers B) to not less than 0.30, advantages are obtained in that such limitation suppresses the generation of fiber clumps during the passage of the carding step stemming from the relative smallness of the fineness of the short fibers A and in that the limitation suppresses lowering of the sound absorbing properties due to the fineness of the short fibers B being relatively large. Furthermore, by limiting the ratio of the fineness of the short fibers A to the fineness of the short fibers B (fineness of the short fibers A/fineness of the short fibers B) to not more than 0.60, the short fibers A having a relatively small fineness and the short fibers B having a relatively large fineness are uniformly dispersed inside the nonwoven fabric at the carding step; the short fibers A have a reduced probability of forming fiber clumps inside the sound-absorbing material nonwoven fabric; the short fibers A that are uniformly dispersed can form porous portions having a large number of micropores inside the sound-absorbing material nonwoven fabric; as a result, the nonwoven fabric attains excellent sound absorption performance when used as a sound-absorbing material.

The tensile strength (sometimes simply referred to as the "strength" in the present specification and other sections) of the short fibers A is preferably not less than 2.5 cN/dtex. When the tensile strength of the short fibers A is not less than 2.5 cN/dtex, the probability is further reduced of the fiber breakage due to the friction between the short fibers A and the card clothing at the carding step in the process of production of the sound-absorbing material nonwoven fabric, and consequently the productivity of the sound-absorbing material nonwoven fabric may be further enhanced. From the above viewpoints, the tensile strength of the short fibers is more preferably not less than 2.8 cN/dtex.

The tensile elongation percentage (sometimes simply referred to as the "elongation percentage" in the present specification and other sections) of the short fibers A is preferably 20 to 40%. When the tensile elongation percentage of the short fibers A is not less than 20%, the probability is further reduced of the fiber breakage due to the friction between the short fibers A and the card clothing at the carding step, and consequently the productivity of the sound-absorbing material nonwoven fabric may be further enhanced. When, on the other hand, the tensile elongation percentage of the short fibers A is not more than 40%, the probability is further reduced of the short fibers A being caught in the card clothing due to the elongation of the short fibers A by friction with the card clothing at the carding step, and consequently the productivity of the sound-absorbing material nonwoven fabric may be further enhanced. From the above viewpoints, the tensile elongation percentage of the short fibers A is more preferably 22% to 35%.

The short fibers A preferably have a tensile strength of not less than 5 cN/dtex and a tensile elongation percentage of 20 to 35%. In this case, advantageously, the probability is further reduced of the fiber breakage due to the friction between the short fibers A and the card clothing at the carding step, the probability is further reduced of the short fibers A being caught in the card clothing due to the elongation by friction with the card clothing, and consequently the productivity of the sound-absorbing material nonwoven fabric may be further enhanced. Furthermore, the reduced probabilities of frictional fiber breakage and of fibers being caught in the card clothing reduce the generation of fiber clumps and allow the short fibers A to be uniformly dispersed to form porous portions having a large number of micropores inside the sound-absorbing material nonwoven fabric. As a result, the nonwoven fabric attains excellent sound absorption performance when used as a sound-absorbing material. Furthermore, from the above viewpoints, the tensile strength of the short fibers A is particularly preferably not less than 6.0 cN/dtex.

The number of crimps of the short fibers A is preferably not less than 10.0 peaks/25 mm. When the number of crimps of the short fibers A is not less than 10.0 peaks/25 mm, the short fibers A and the short fibers B are uniformly dispersed inside the nonwoven fabric at the carding step, with reduced probability of the short fibers A forming fiber clumps inside the sound-absorbing material nonwoven fabric, and the quality of the sound-absorbing material nonwoven fabric is enhanced. Furthermore, the short fibers A that are uniformly dispersed can form porous portions having a large number of micropores inside the sound-absorbing material nonwoven fabric, and a sound-absorbing material using this nonwoven fabric attains excellent sound absorption performance. From the above viewpoints, the number of crimps of the short fibers A is more preferably not less than 12.0 peaks/25 mm, and particularly preferably not less than 12.5 peaks/25 mm. The upper limit of the number of crimps of the short fibers A is not particularly limited, but is preferably not more than 18 peaks/25 mm from points of view such as the dispersibility of the short fibers A.

The crimping degree of the short fibers A is preferably not less than 12.0%. When the crimping degree of the short fibers A is not less than 12.0%, the short fibers A and the short fibers B are uniformly dispersed at the carding step, with reduced probability of the short fibers A forming fiber clumps inside the sound-absorbing material nonwoven fabric, and the quality of the sound-absorbing material nonwoven fabric is enhanced. Furthermore, the short fibers A that are uniformly dispersed can form porous portions having a large number of micropores inside the sound-absorbing material nonwoven fabric, and the nonwoven fabric attains excellent sound absorption performance when used as a sound-absorbing material. From the above viewpoints, the crimping degree of the short fibers A is more preferably not less than 13.0%, and particularly preferably not less than 14.0%. The upper limit of the crimping degree of the short fibers A is not particularly limited, but is preferably not more than 19% from points of view such as the dispersibility of the short fibers A.

The fiber length of the short fibers A is preferably in the range of 2.5 to 4.5 cm. When the fiber length of the short fibers A is not more than 4.5 cm, the short fibers are unlikely to be caught in the card clothing at the carding step in the process of production of the sound-absorbing material nonwoven fabric, and consequently the productivity of the sound-absorbing material nonwoven fabric may be enhanced. When, on the other hand, the fiber length is not less than 2.5 cm, the short fibers in a carded web are highly entangled with one another, and the web may be reliably transferred to a needle punching step or a spunlacing step described later; as a result, the productivity of the sound-absorbing material nonwoven fabric may be enhanced. From the above viewpoints, the fiber length of the short fibers A is more preferably in the range of 3.0 to 4.5 cm.

In the sound-absorbing material nonwoven fabric according to an embodiment of the present invention, the short fibers A described above are contained in an amount of not less than 30 mass % relative to the total mass of the sound-absorbing material nonwoven fabric. With this configuration, the short fibers A having a smaller fineness can form porous portions having a large number of micropores inside the sound-absorbing material nonwoven fabric. When sound passes through the voids between the fibers (that is, through the porous portions), the sound may be efficiently converted into heat by air friction with the fibers around the voids. Thus, the sound-absorbing material nonwoven fabric may attain excellent sound absorbing properties when used as a sound-absorbing material. On the other hand, the content of the short fibers A is not more than 80 mass % relative to the total mass of the sound-absorbing material nonwoven fabric. With this configuration, the occurrence of problems such as the breakage of the short fibers A at the carding step may be suppressed extremely effectively. From the above viewpoints, the content of the short fibers A is preferably not less than 40 mass %, and more preferably not less than 45 mass %, and is preferably not more than 70 mass %, and more preferably not more than 65 mass % relative to the total mass of the sound-absorbing material nonwoven fabric.

Here, thermoplastic resins such as polyester resins, polyamide resins, acrylic resins and polyolefin resins may be used as the materials forming the short fibers A. Among these, the short fibers A are preferably short fibers made of an acrylic resin (acrylic short fibers), short fibers made of a polyethylene terephthalate resin (polyethylene terephthalate short fibers) or short fibers made of a polyester resin (polyester short fibers) for the reason that heat resistance is excellent, that is, deformation or discoloration in a high temperature environment may be reduced when the sound-absorbing material nonwoven fabric is used in an engine room of an automobile or the like. In particular, the short fibers are more preferably made of an acrylic resin or a polyethylene terephthalate resin for the reason that such short fibers have higher heat resistance. The short fibers A are particularly preferably short fibers made of an acrylic resin for the reason that the occurrence of fiber clumps at the carding step is small, although the mechanism thereof is not clear. Incidentally, the above thermoplastic resins may be polymers of a plurality of kinds of monomers, or may contain additives such as stabilizers.

Furthermore, thermoplastic resins such as polyester resins, polyamide resins, acrylic resins and polyolefin resins may be used as the materials forming the short fibers B. Among these, the short fibers B are preferably short fibers made of an acrylic resin, short fibers made of a polyethylene terephthalate resin or short fibers made of a polyester resin for the reason that heat resistance is excellent, that is, deformation or discoloration in a high temperature environment may be reduced when the sound-absorbing material nonwoven fabric is used in an engine room of an automobile or the like. In particular, the short fibers are more preferably made of a polyethylene terephthalate resin having particularly high heat resistance. Incidentally, the above thermoplastic resins may be polymers of a plurality of kinds of monomers, or may contain additives such as stabilizers.

The basis weight of the sound-absorbing material nonwoven fabric according to the present invention is preferably not less than 150 g/m$^2$ and not more than 500 g/m$^2$. When the basis weight is not less than 150 g/m$^2$, the sound absorption performance utilizing air friction may be enhanced. When, on the other hand, the basis weight is not more than 500 g/m$^2$, the flexibility may be enhanced, and the sound-absorbing material nonwoven fabric exhibits excellent three-dimensional contour followability when used as an automobile member or the like. From the above viewpoints, the basis weight is preferably not less than 200 g/m$^2$, and more preferably not less than 250 g/m$^2$. Furthermore, the upper limit of the basis weight is preferably not more than 400 g/m$^2$, and more preferably not more than 350 g/m$^2$.

Furthermore, the thickness of the sound-absorbing material nonwoven fabric is preferably not less than 0.6 mm and not more than 4.0 mm. When the thickness is not less than 0.6 mm, the porous portions of the sound-absorbing material nonwoven fabric have a sufficient size, and sound passing through the sound-absorbing material nonwoven fabric in the thickness direction may be more efficiently converted into heat by air friction. When, on the other hand, the thickness is not more than 4.0 mm, the sound-absorbing material nonwoven fabric has a densified structure in which the short fibers A form microporous portions, and the sound-absorbing material nonwoven fabric can convert sound into heat by air friction more efficiently and consequently attains higher sound absorption performance when used as a sound-absorbing material. From the above viewpoints, the thickness is preferably not less than 0.7 mm, and more preferably not less than 0.8 mm. The upper limit of the thickness is preferably not more than 3.0 mm, and more preferably not more than 2.5 mm. Incidentally, the thickness measured in the present invention is the thickness of the nonwoven fabric under a pressure of 0.36 kPa based on JIS L1913: 1998 6.1.2 Method A.

The density of the sound-absorbing material nonwoven fabric is preferably not less than 0.07 g/cm$^3$ and not more than 0.40 g/cm$^3$. When the density is not less than 0.07 g/cm$^3$, the sound-absorbing material nonwoven fabric has a dense structure in which the short fibers A form microporous portions, and the sound-absorbing material nonwoven fabric can convert sound into heat by air friction more efficiently and consequently attains higher sound absorption performance when used as a sound-absorbing material. When, on the other hand, the density is not more than 0.40 g/cm$^3$, the porous portions in the sound-absorbing material nonwoven fabric have a sufficient size, and the sound absorption performance utilizing air friction is enhanced. From the above viewpoints, the density is preferably not less than 0.09 g/cm$^3$, and more preferably not less than 0.10 g/cm$^3$. Furthermore, the upper limit of the density is preferably not more than 0.35 g/cm$^3$, and more preferably not more than 0.32 g/cm$^3$.

The L value in the L*a*b* color system of the sound-absorbing material nonwoven fabric is preferably not more than 70. When the L value is not more than 70, discoloration of the sound-absorbing material nonwoven fabric in a high temperature environment can be made inconspicuous. From the above viewpoint, the L value is preferably not more than 65, and more preferably not more than 60. On the other hand, the lower limit of the L value is not particularly limited but is preferably not less than 20 for the reason that stable production is feasible. The L value of the sound-absorbing material nonwoven fabric may be controlled to 70 or less by adopting, as the short fibers A and/or the short fibers B, spun-dyed fibers containing carbon black or the like. The content of the spun-dyed fibers is preferably not less than 15 mass %, and more preferably not less than 30 mass % relative to the total mass of the sound-absorbing material nonwoven fabric. The L value in the L*a*b* color system in the present invention is the color system that is standardized by the Commission Internationale de l'Eclairage (CIE) and is also adopted in JIS Z8781-4: 2013. The L value in the L*a*b* color system is measured using a colorimeter or the like. The discoloration of the sound-absorbing material nonwoven fabric in a high temperature environment may be evaluated by measuring the difference between the b value of the sound-absorbing material nonwoven fabric before being placed in a high temperature environment and the b value of the sound-absorbing material nonwoven fabric after being placed in the high temperature environment.

The sound-absorbing material nonwoven fabric preferably has a pore size distribution in which pores having a diameter of not less than 5 μm and less than 10 μm represent 1 to 60%, pores having a diameter of not less than 10 μm and less than 15 μm represent 10 to 70%, and pores having a diameter of not less than 15 μm and less than 20 μm represent 2 to 50%. By having such a pore size distribution, the sound-absorbing material nonwoven fabric may convert sound into heat more efficiently utilizing air friction and consequently attains higher sound absorption performance when used as a sound-absorbing material. From the above viewpoints, the pore size distribution is more preferably such that pores having a diameter of not less than 5 μm and less than 10 μm represent 3 to 55%, pores having a diameter of not less than 10 μm and less than 15 μm represent 20 to 60%, and pores having a diameter of not less than 15 μm and less than 20 μm represent 3 to 40%. In particular, the pore size distribution is still more preferably such that pores having a diameter of not less than 5 μm and less than 10 μm represent 5 to 50%, pores having a diameter of not less than 10 μm and less than 15 μm represent 25 to 55%, and pores having a diameter of not less than 15 μm and less than 20 μm represent 5 to 35%. Incidentally, the pore size distribution is measured by the method specified in ASTM F316-86.

The air permeability of the sound-absorbing material nonwoven fabric according to the present invention is preferably 4 to 35 $cm^3/cm^2/s$. When the air permeability of the sound-absorbing material nonwoven fabric is not less than 4 $cm^3/cm^2/s$, the sound-absorbing material nonwoven fabric advantageously attains higher sound absorption performance utilizing air friction. From the above viewpoint, the air permeability is preferably not less than 6 $cm^3/cm^2/s$, and particularly preferably not less than 7 $cm^3/cm^2/s$. When, on the other hand, the air permeability of the sound-absorbing material nonwoven fabric is not more than 35 $cm^3/cm^2/s$, the sound absorption performance utilizing air friction is advantageously enhanced. From the above viewpoint, the air permeability is preferably not more than 30 $cm^3/cm^2/s$, and more preferably not more than 25 $cm^3/cm^2/s$. Incidentally, the air permeability is measured in accordance with JIS L 1096-1999 8.27.1 Method A (Frazier method).

Next, a preferred method for producing the sound-absorbing material nonwoven fabric according to the present invention will be described. A preferred method for producing the nonwoven fabric according to the present invention includes the following steps.

(a) A step of opening the short fibers A and the short fibers B.

(b) A step of forming the short fibers A and the short fibers B into a web.

(c) A step of entangling the short fibers A and the short fibers B with needles or water jets to give a nonwoven fabric.

These steps (a) to (c) will be described in detail below.

First, the step (a) (the opener step) will be described in which the short fibers A and the short fibers B are opened.

In the opener step, the short fibers A and the short fibers B (hereinafter, also collectively referred to as the short fibers) are weighed out so that the content of the short fibers A and the content of the short fibers B in the sound-absorbing material nonwoven fabric will be desired values. Thereafter, the short fibers are sufficiently opened and mixed using air or the like.

Next, the step (b) (the carding step) will be described in which the short fibers A and the short fibers B are formed into a web.

At the carding step, the short fibers mixed at the opener step are aligned with a card clothing roller to form a web.

Next, the step (c) (the entangling step) will be described in which the short fibers A and the short fibers B are entangled using needles or water jets to form a nonwoven fabric.

At the entangling step, the short fibers are preferably entangled with one another by a mechanical entanglement method such as a needle punching method or a water jet punching method (a hydroentanglement method). Such a method is preferably adopted because the method can form a dense sound-absorbing material nonwoven fabric as compared with other methods such as a chemical bonding method, and can easily produce a sound-absorbing material nonwoven fabric with a desired thickness and a desired density.

When the short fibers are entangled by a needle punching method, the needle density at the entanglement treatment is preferably not less than 200 $needles/cm^2$. The needle density in the entanglement is more preferably not less than 250 $needles/cm^2$, and particularly preferably not less than 300 $needles/cm^2$. This needle density is advantageous in that the sound-absorbing material nonwoven fabric can be densified, and the sound-absorbing material nonwoven fabric attains enhanced sound absorption performance when used as a sound-absorbing material.

When the short fibers are entangled by a water jet punching method, it is preferable that the pressure of the water jet punching nozzles be not less than 12.0 MPa and the short fibers be passed through the water nozzles three or more times. When the pressure of the water jet punching nozzles is not less than 12.0 MPa, advantages are obtained in that the sound-absorbing material nonwoven fabric can be densified, and the sound-absorbing material nonwoven fabric attains enhanced sound absorption performance when used as a sound-absorbing material. Furthermore, three or more times of passage through the water nozzles is similarly advantageous in that the sound-absorbing material nonwoven fabric can be densified, and the sound-absorbing material nonwoven fabric attains enhanced sound absorption performance when used as a sound-absorbing material. The short fibers may be passed through the water nozzles in such a manner that the short fibers are passed through the water nozzles three or more times continuously or in such a manner that the nonwoven fabric is wound after each passage through the water nozzles and is then passed again through the water nozzles. To enhance productivity, the short fibers are preferably passed three or more times continuously.

When the fibers are entangled by a water jet punching method, water may be jetted through the nozzles in any order such as front side/backside/front side, front side/backside/backside, or front side/front side/backside/front side/backside wherein the front side is the side that faces upward in contact with the nozzle faces at the first water jetting, and the backside is the side opposite to the front side.

Next, a sound-absorbing material will be described. A sound-absorbing material including the sound-absorbing material nonwoven fabric according to the present invention preferably includes a layer member having a thickness of 5 to 50 mm on the side of the sound-absorbing material nonwoven fabric according to the present invention opposite to the side on which sound will enter. The layer member is preferably a fiber porous body, a foam, or an air layer. That is, the sound-absorbing material nonwoven fabric according to the present invention may be used in combination with a 5 to 50 mm thick substrate, such as a substrate made of a fiber porous body including thermoplastic resin fibers or a fiber porous body including inorganic fibers, or a substrate made of a foam such as urethane foam, attached to the side opposite to the side on which sound will enter. Such a composite product (a sound-absorbing material) exhibits outstanding sound absorption performance. Furthermore, an air layer having a thickness of 5 to 50 mm may be provided on the side of the sound-absorbing material nonwoven fabric according to the present invention opposite to the side on which sound will enter. Such a composite product (a sound-absorbing material) composed of the sound-absorbing laminated nonwoven fabric and the air layer exhibits outstanding sound absorption performance.

EXAMPLES

Measurement methods used in Examples will be described below.

(Measurement Methods)

(1) Short Fibers Constituting Sound-Absorbing Material Nonwoven Fabrics and Contents In accordance with JIS L 1030-1: 2006 "Testing methods for quantitative analysis of fibre mixtures—Part 1: Testing methods for fibre identification" and JIS L 1030-2: 2005 "Testing methods for quantitative analysis of fibre mixtures of textiles—Part 2: Testing methods for quantitative analysis of fibre mixtures", the mixture ratios based on corrected masses (the mass ratios of short fibers in the standard state) were measured as the contents (mass %) of fibers constituting a sound-absorbing material nonwoven fabric. In this manner, the fiber materials constituting the sound-absorbing material nonwoven fabric and the contents (mass %) thereof were identified.

(2) Fineness and Contents of Short Fibers Constituting Sound-Absorbing Material Nonwoven Fabrics A nonwoven fabric was dissolved by 6. Dissolution method specified in JIS L 1030-2: 2005 "Testing methods for quantitative analysis of fibre mixtures of textiles—Part 2: Testing methods for quantitative analysis of fibre mixtures" described in (1) above. Cross sections of the residual fibers were observed on a scanning electron microscope (SEM) (S-3500N manufactured by Hitachi High-Tech Corporation). Thirty observation areas were randomly extracted, and cross-sectional images were captured at a magnification of 1,000 times. Furthermore, the single fiber diameter was measured with respect to all the fibers present in the cross-sectional images. When the fiber had an odd cross-sectional shape, the cross-sectional area of the fiber was measured from the cross-sectional image, and the true circle diameter was calculated from the cross-sectional area to determine the single fiber diameter of the fiber. The obtained data of the single fiber diameters was sharply divided into 0.1 μm sections, and the average single fiber diameter in each section was calculated and the number of fibers in each section was counted. From the average single fiber diameter obtained with respect to each section and the specific gravity of each of the short fibers identified in (1) above, the fineness of the fibers in each section was calculated using the following equation (2).

$$\text{Fineness (dtex)}=(\text{average single fiber diameter }(\mu m)/2)^2\times 3.14\times\text{specific gravity of short fibers}/100 \tag{2}$$

Regarding those fibers having a fineness of 0.4 to 0.9 dtex of the above fiber fineness values, the content (mass %) of the fibers having a fineness of 0.4 to 0.9 dtex was calculated from the fineness in each section, the number of fibers in each section, and the specific gravity of the fiber material.

$$\text{Content (mass \%) of fibers having fineness of 0.4 to 0.9 dtex}=((\text{fineness (dtex) of fibers in respective sections having fineness of 0.4 to 0.9 dtex}\times\text{fiber count (fibers) in the same sections})/(\text{fineness (dtex) of fibers in respective sections other than fibers having fineness of 0.4 to 0.9 dtex}\times\text{fiber count (fibers) in the same sections})\times 100 \tag{3}$$

The content (mass %) of fibers having a fineness of 1.1 to 20.0 dtex was obtained in the similar manner.

When the fibers constituting the sound-absorbing material nonwoven fabric were made of a plurality of materials, the fineness and content were measured with respect to each fiber material using the fibers that remained after the nonwoven fabric was dissolved by the dissolution method, and thereby the fineness and contents of the fibers constituting the sound-absorbing material nonwoven fabric were determined.

(3) Fiber Length of Short Fibers Constituting Sound-Absorbing Material Nonwoven Fabrics The fiber length was measured in cm unit by the direct method (Method C) specified in JIS L 1015: 2010 8.4.1.

(4) Strength and Elongation Percentage of Short Fibers Constituting Sound-Absorbing Material Nonwoven Fabrics In accordance with JIS L 1015 (1999) 8.7.1, short fibers were individually laid on a piece of paper under loose tension along dividing lines and were fixed to the piece of paper by applying an adhesive to both ends of the fiber with a space distance of 20 mm. The fiber in each division was used as an individual specimen. The specimen was attached to clamps of a tensile tester, and the piece of paper was cut near the upper clamp. The specimen was pulled from the clamp interval of 20 mm at a stress rate of 20 mm/min, and the load (N) and elongation (mm) at breakage of the specimen were measured. The tensile strength (cN/dtex) and elongation percentage (%) were calculated from the following equations.

$$Tb=SD/F0$$

Tb: Tensile strength (cN/dtex)

SD: Load (cN) at break

F0: Corrected fineness (dtex) of specimen $$S=\{(E2-E1)/(L+E1)\}\times 100$$

S: Elongation percentage (%)

E1: Looseness (mm)

E2: Elongation (mm) at breakage or elongation (mm) under maximum load

L: Clamp interval (mm)

(5) Number of Crimps in Short Fibers Constituting Sound-Absorbing Material Nonwoven Fabrics In accordance with the method specified in JIS L 1015-8-12-1 and 2 (2010 revised edition), the number of crimps (peaks/25 mm) in fibers constituting a nonwoven fabric was measured.

(6) Crimping Degree of Short Fibers Constituting Sound-Absorbing Material Nonwoven Fabrics In accordance with the method specified in JIS L 1015-8-12-1 and 2 (2010 revised edition), the crimping percentage (%) of fibers constituting a nonwoven fabric was measured as the crimping degree (%) of the fibers.

(7) Carding Step Passage Rate (Productivity and Quality)

Raw cotton that has a short fiber ratio adjusted to actual use and has been subjected to an opener step is weighed out in 20 g and is placed into a lab carding machine (cylinder rotational speed: 300 rpm, doffer speed: 10 m/min). The mass (g) is measured of the web of fibers discharged from the carding machine without being wasted or caught in the card clothing due to fiber breakage during the carding step. From the measures such as the mass of the web, the carding step passage rate was calculated from the equation below. It can be said that the carding step passage rate is better with increasing value of the carding step passage rate.

$$\text{Carding step passage rate (\%)} = \text{mass (g) of web}/\text{mass (g) charged} \times 100$$

Separately, the appearance of the sound-absorbing material nonwoven fabric obtained was visually observed. Three test pieces having a 300 mm×300 mm size were collected from the sample sound-absorbing material nonwoven fabric using a steel ruler and a razor blade, and the number of fiber clumps was counted and converted into a number of fiber clumps (clumps/$m^2$).

(8) Basis Weight of Sound-Absorbing Material Nonwoven Fabrics

The basis weight was measured based on JIS L 1913: 1998 6.2. Three test pieces having a 300 mm×300 mm size were collected from a sample sound-absorbing material nonwoven fabric using a steel ruler and a razor blade. The mass of the test pieces in the standard state was measured, and the basis weight, the mass per unit area, was calculated from the equation below, the results being averaged.

$$ms = m/S$$

ms: mass per unit area (g/$m^2$)

m: average mass (g) of test pieces of sound-absorbing material nonwoven fabric

S: area ($m^2$) of test pieces of sound-absorbing material nonwoven fabric (9) Thickness of Sound-Absorbing Material Nonwoven Fabrics The thickness was measured based on JIS L 1913: 1998 6.1.2 Method A. Five test pieces having a 50 mm×50 mm size were collected from a sample sound-absorbing material nonwoven fabric. Using a thickness meter (constant pressure thickness meter PG11J manufactured by TECLOCK Co., Ltd.), the thickness was measured after the test piece in the standard state was placed under a pressure of 0.36 kPa for 10 seconds. The measurement was performed for each of the (five) test pieces, and the results were averaged.

(10) Density of Sound-Absorbing Material Nonwoven Fabrics

The density was calculated using the equation below based on the basis weight (8) of the sound-absorbing material nonwoven fabric and the thickness (9) of the sound-absorbing material nonwoven fabric.

$$\text{Density (g/cm}^3\text{) of sound-absorbing material nonwoven fabric} = \text{basis weight (g/m}^2\text{) of sound-absorbing material nonwoven fabric}/\text{thickness (mm) of sound-absorbing material nonwoven fabric}/1000$$

(11) Pore Size Distribution Frequencies of Sound-Absorbing Material Nonwoven Fabrics The pore size distribution frequencies were measured by the method specified in ASTM F316-86. The measurement device used was "Perm Porometer" manufactured by Porous Materials, Inc. (USA), and the measurement reagent used was "Galwick" manufactured by PMI. The pore size distribution (%) was measured at a cylinder pressure of 100 kPa in a measurement mode of WET UP-DRY UP. The pore size distribution (%) of not less than 5 μm and less than 10 μm, of not less than 10 μm and less than 15 μm, and of not less than 15 μm and less than 20 μm is shown.

(12) Air Permeability of Sound-Absorbing Material Nonwoven Fabrics

The air permeability was measured in accordance with JIS L 1096-1999 8.27.1 Method A (Frazier method). Five test pieces having a 200 mm×200 mm size were collected from a sample sound-absorbing material nonwoven fabric. The test piece was attached to one end (the suction side) of a cylinder of a Frazier tester. This attachment of the test piece was performed in such a manner that the test piece was placed on the cylinder, and a load of about 98 N (10 kgf) was uniformly applied onto the test piece while avoiding the closure of the suction portion so as to prevent air leakage at the joint of the test piece. After the test piece had been attached, a suction fan was adjusted with use of a rheostat so that an inclined barometer indicated a pressure of 125 Pa. Based on the pressure indicated on a vertical barometer and the type of the air hole used, the amount of air ($cm^3/cm^2/s$) that passed through the test piece was determined from the table supplied with the tester. The results of the five test pieces were averaged.

(13) Normal Incidence Sound Absorption Coefficient of Sound-Absorbing Material Nonwoven Fabrics The measurement was performed in accordance with the normal incidence sound absorption measurement method (in-tube method) specified in JIS A 1405 (1998). Three circular test pieces having a diameter of 92 mm were collected from a sample sound-absorbing material nonwoven fabric. The tester used was an automatic normal incidence sound absorption coefficient measuring device (model 10041A) manufactured by Denshi Sokuki K.K. The test piece was attached to one end of an impedance tube for measurement, together with a spacer so as to form a 20 mm thick air layer between the test piece and a metal reflector. The coefficient of sound absorption measured at each frequency was multiplied by 100 to give the sound absorption coefficient. The values of sound absorption coefficient obtained at 1000 Hz were averaged to give the low-frequency sound absorption coefficient (%), and the values of sound absorption coefficient obtained at 2000 Hz were averaged to give the high-frequency sound absorption coefficient (%).

(14) L Values in L*a*b* Color System of Sound-Absorbing Material Nonwoven Fabrics Three test pieces having a 100 mm×100 mm size were collected from a sample sound-absorbing material nonwoven fabric. Using a colorimeter (CR310 manufactured by Minolta Camera Co., Ltd.), the L value was measured with respect to the three test pieces under the conditions of light source: D65 and viewing angle: 2°. The results were averaged to give the L value in the L*a*b* color system of the sound-absorbing material nonwoven fabric.

(15) Change in b Value in L*a*b* Color System of Sound-Absorbing Material Nonwoven Fabrics The test pieces used in (14) above were placed onto an iron plate, which was then placed into a hot air oven at 150°

C. Under static conditions, the test pieces were heat treated for 500 hours. After the heat treatment at 150° C. for 500 hours, the test pieces were analyzed with a colorimeter (CR310 manufactured by Minolta Camera Co., Ltd.) under the conditions of light source: D65 and viewing angle: 2° to determine the b value. The results of the three test pieces treated at 150° C. for 500 hours were averaged. The change in b value before and after the treatment was calculated using the following equation.

Change in $b$ value=$b$ value of test pieces before treatment−$b$ value of test pieces after treatment at 150° C. for 500 hours Example 1

Short fibers A were 50 mass % of acrylic short fibers that had a fineness of 0.48 dtex, a fiber length of 3.8 cm, a strength of 2.9 cN/dtex, an elongation percentage of 24%, a number of crimps of 13.1 peaks/25 mm, a crimping degree of 15.6%, and a carding passage coefficient of 26. Short fibers B were 50 mass % of polyethylene terephthalate (PET) short fibers that contained 2 mass % of carbon black and had a fineness of 1.45 dtex and a fiber length of 5.1 cm. The short fibers were subjected to an opener step and to a carding step (cylinder rotational speed: 300 rpm, doffer speed: 10 m/min). Thereafter, the fibers were subjected to a hydroentanglement step under the following conditions (five passes under pressure conditions of 8.0 MPa on the upper side, 10.0 MPa on the upper side, 13.5 MPa on the lower side, 16.0 MPa on the upper side, and 13.5 MPa on the lower side) and then dried at a drying step at 120° C. A sound-absorbing material nonwoven fabric was thus obtained that had a fineness ratio of the short fibers A to the short fibers B of 0.33, a basis weight of 300 $g/m^2$, a thickness of 2.1 mm and a nonwoven fabric density of 0.143 $g/cm^3$.

No fibers were wasted or caught in the card clothing due to fiber breakage during the carding step, and the sound-absorbing material nonwoven fabric of Example 1 attained a good carding step passage rate of 95%. Furthermore, the short fibers were excellently dispersed and formed few fiber clumps, thus offering high quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Example 2

Short fibers A were 50 mass % of acrylic short fibers that had a fineness of 0.71 dtex, a fiber length of 3.8 cm, a strength of 2.9 cN/dtex, an elongation percentage of 23%, a number of crimps of 13.0 peaks/25 mm, a crimping degree of 15.7% and a carding passage coefficient of 37. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.49, a basis weight of 300 $g/m^2$, a thickness of 2.3 mm and a nonwoven fabric density of 0.130 $g/cm^3$.

No fibers were wasted or caught in the card clothing due to fiber breakage during the carding step, and the sound-absorbing material nonwoven fabric of Example 2 attained a good carding step passage rate of 97%. Furthermore, the short fibers were excellently dispersed and formed no fiber clumps, thus offering high quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Example 3

Short fibers A were 50 mass % of acrylic short fibers that had a fineness of 0.86 dtex, a fiber length of 5.1 cm, a strength of 2.8 cN/dtex, an elongation percentage of 23%, a number of crimps of 13.1 peaks/25 mm, a crimping degree of 15.6% and a carding passage coefficient of 32. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.59, a basis weight of 300 $g/m^2$, a thickness of 2.4 mm and a nonwoven fabric density of 0.125 $g/cm^3$.

No fibers were wasted or caught in the card clothing due to fiber breakage during the carding step, and the sound-absorbing material nonwoven fabric of Example 3 attained a good carding step passage rate of 98%. Furthermore, the short fibers were excellently dispersed and formed no fiber clumps, thus offering high quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Example 4

A sound-absorbing material nonwoven fabric having a fineness ratio of the short fibers A to the short fibers B of 0.49, a basis weight of 300 $g/m^2$, a thickness of 2.4 mm and a nonwoven fabric density of 0.125 $g/cm^3$ was obtained by the same steps under the same treatment conditions as in Example 1, except that the short fibers A were changed to 35 mass % of the acrylic short fibers used in Example 2 and the short fibers B were changed to 65 mass % of the polyethylene terephthalate (PET) short fibers used in Example 2.

No fibers were wasted or caught in the card clothing due to fiber breakage during the carding step, and the sound-absorbing material nonwoven fabric of Example 4 attained a good carding step passage rate of 98%. Furthermore, the short fibers were excellently dispersed and formed no fiber clumps, thus offering high quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Example 5

A sound-absorbing material nonwoven fabric having a fineness ratio of the short fibers A to the short fibers B of 0.49, a basis weight of 300 g/m$^2$, a thickness of 2.3 mm and a nonwoven fabric density of 0.130 g/cm$^3$ was obtained by the same steps under the same treatment conditions as in Example 1, except that the short fibers A were changed to 75 mass % of the acrylic short fibers used in Example 2 and the short fibers B were changed to 25 mass % of the polyethylene terephthalate (PET) short fibers used in Example 2.

Few fibers were wasted or caught in the card clothing due to fiber breakage during the carding step, and the sound-absorbing material nonwoven fabric of Example 5 attained a relatively good carding step passage rate of 91%. Furthermore, the short fibers were excellently dispersed and formed few fiber clumps, thus offering relatively high quality.

The sound-absorbing laminated nonwoven fabric obtained had a high low-frequency sound absorption coefficient and a high high-frequency sound absorption coefficient, and had a relatively small change in the b value after the treatment at 150° C. for 500 hours, thus showing good heat resistance.

Example 6

Short fibers A were 50 mass % of acrylic short fibers that had a fineness of 0.70 dtex, a fiber length of 3.8 cm, a strength of 1.8 cN/dtex, an elongation percentage of 17%, a number of crimps of 13.0 peaks/25 mm, a crimping degree of 15.7% and a carding passage coefficient of 20. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.48, a basis weight of 300 g/m$^2$, a thickness of 2.4 mm and a nonwoven fabric density of 0.125 g/cm$^3$.

Relatively few fibers were wasted or caught in the card clothing due to fiber breakage during the carding step, and the sound-absorbing material nonwoven fabric of Example 6 attained a relatively good carding step passage rate of 86%. Furthermore, the short fibers were excellently dispersed and formed few fiber clumps, thus offering high quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Example 7

Short fibers A were 50 mass % of acrylic short fibers that had a fineness of 0.71 dtex, a fiber length of 3.8 cm, a strength of 2.9 cN/dtex, an elongation percentage of 24%, a number of crimps of 8.0 peaks/25 mm, a crimping degree of 9.0% and a carding passage coefficient of 23. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.49, a basis weight of 300 g/m$^2$, a thickness of 2.4 mm and a nonwoven fabric density of 0.125 g/cm$^3$.

Relatively few fibers were wasted or caught in the card clothing due to fiber breakage during the carding step, and the sound-absorbing material nonwoven fabric of Example 7 attained a relatively good carding step passage rate of 88%. Furthermore, the short fibers were excellently dispersed and formed relatively few fiber clumps, thus offering relatively high quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Example 8

A sound-absorbing material nonwoven fabric having a fineness ratio of the short fibers A to the short fibers B of 0.49, a basis weight of 140 g/m$^2$, a thickness of 1.4 mm and a nonwoven fabric density of 0.100 g/cm$^3$ was obtained by the same steps under the same treatment conditions as in Example 1, except that the short fibers A were changed to 50 mass % of the acrylic short fibers used in Example 2, the short fibers B were changed to 50 mass % of the polyethylene terephthalate (PET) short fibers used in Example 2, and the basis weight was changed.

No fibers were wasted or caught in the card clothing due to fiber breakage during the carding step, and the sound-absorbing material nonwoven fabric of Example 8 attained a good carding step passage rate of 97%. Furthermore, the short fibers were excellently dispersed and formed no fiber clumps, thus offering high quality.

The sound-absorbing laminated nonwoven fabric obtained had a relatively high low-frequency sound absorption coefficient and a high high-frequency sound absorption coefficient, and had a relatively small change in the b value after the treatment at 150° C. for 500 hours, thus showing good heat resistance.

Example 9

A sound-absorbing material nonwoven fabric having a fineness ratio of the short fibers A to the short fibers B of 0.49, a basis weight of 300 g/m$^2$, a thickness of 4.5 mm and a nonwoven fabric density of 0.067 g/cm$^3$ was obtained by the same steps under the same treatment conditions as in Example 1, except that the short fibers A were changed to 50 mass % of the acrylic short fibers used in Example 2, the short fibers B were changed to 50 mass % of the polyethylene terephthalate (PET) short fibers used in Example 2, and the hydroentanglement step included five passes under pressure conditions of 8.0 MPa on the upper side, 10.0 MPa on the upper side, 11.0 MPa on the lower side, 11.0 MPa on the upper side, and 11.0 MPa on the lower side.

No fibers were wasted or caught in the card clothing due to fiber breakage during the carding step, and the sound-absorbing material nonwoven fabric of Example 9 attained a good carding step passage rate of 97%. Furthermore, the short fibers were excellently dispersed and formed no fiber clumps, thus offering high quality.

The sound-absorbing laminated nonwoven fabric obtained had a relatively high low-frequency sound absorption coefficient and a high high-frequency sound absorption coefficient, and had a relatively small change in the b value after the treatment at 150° C. for 500 hours, thus showing good heat resistance.

Example 10

Short fibers A were 50 mass % of polyethylene terephthalate (PET) short fibers that had a fineness of 0.56 dtex, a fiber length of 3.8 cm, a strength of 3.2 cN/dtex, an elongation percentage of 24%, a number of crimps of 13.5 peaks/25 mm, a crimping degree of 15.2% and a carding passage coefficient of 33. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.39, a basis weight of 300 g/m$^2$, a thickness of 2.2 mm and a nonwoven fabric density of 0.136 g/cm$^3$.

Relatively few fibers were wasted or caught in the card clothing due to fiber breakage during the carding step, and the sound-absorbing material nonwoven fabric of Example 10 attained a relatively good carding step passage rate of 88%. Furthermore, the short fibers were excellently dispersed and formed relatively few fiber clumps, thus offering relatively high quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Example 11

Short fibers A were 50 mass % of polyethylene terephthalate (PET) short fibers that had a fineness of 0.85 dtex, a fiber length of 5.1 cm, a strength of 3.1 cN/dtex, an elongation percentage of 25%, a number of crimps of 13.3 peaks/25 mm, a crimping degree of 15.5% and a carding passage coefficient of 37. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.59, a basis weight of 300 g/m$^2$, a thickness of 2.4 mm and a nonwoven fabric density of 0.125 g/cm$^3$.

Relatively few fibers were wasted or caught in the card clothing due to fiber breakage during the carding step, and the sound-absorbing material nonwoven fabric of Example 11 attained a relatively good carding step passage rate of 89%. Furthermore, the fibers were excellently dispersed and formed relatively few fiber clumps, thus offering relatively high quality.

The sound-absorbing laminated nonwoven fabric obtained had a relatively high low-frequency sound absorption coefficient and a high high-frequency sound absorption coefficient, and had a small change in the b value after the treatment at 150° C. for 500 hours, thus showing good heat resistance.

Example 12

Short fibers A were 50 mass % of polyethylene terephthalate (PET) short fibers that had a fineness of 0.56 dtex, a fiber length of 3.8 cm, a strength of 3.2 cN/dtex, an elongation percentage of 24%, a number of crimps of 13.5 peaks/25 mm, a crimping degree of 15.2% and a carding passage coefficient of 33. Short fibers B were 50 mass % of polyethylene terephthalate (PET) short fibers that contained 2 mass % of carbon black and had a fineness of 6.61 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.08, a basis weight of 300 g/m$^2$, a thickness of 2.4 mm and a nonwoven fabric density of 0.125 g/cm$^3$.

No fibers were wasted or caught in the card clothing due to fiber breakage during the carding step, and the sound-absorbing material nonwoven fabric of Example 12 attained a good carding step passage rate of 94%. Furthermore, the fibers were excellently dispersed and formed few fiber clumps, thus offering high quality.

The sound-absorbing laminated nonwoven fabric obtained had a relatively high low-frequency sound absorption coefficient and a high high-frequency sound absorption coefficient, and had a small change in the b value after the treatment at 150° C. for 500 hours, thus showing good heat resistance.

Example 13

Short fibers A were 50 mass % of polyethylene terephthalate (PET) short fibers that had a fineness of 0.56 dtex, a fiber length of 3.8 cm, a strength of 3.2 cN/dtex, an elongation percentage of 24%, a number of crimps of 13.5 peaks/25 mm, a crimping degree of 15.2% and a carding passage coefficient of 33. Short fibers B were 50 mass % of polyethylene terephthalate (PET) short fibers that contained 2 mass % of carbon black and had a fineness of 19.25 dtex and a fiber length of 6.4 cm. These short fibers were treated at the same steps under the same conditions as in Example 1 to give a sound-absorbing material nonwoven fabric having a fineness ratio of the short fibers A to the short fibers B of 0.03, a basis weight of 300 g/m$^2$, a thickness of 2.4 mm and a nonwoven fabric density of 0.125 g/cm$^3$.

No fibers were wasted or caught in the card clothing due to fiber breakage during the carding step, and the sound-absorbing material nonwoven fabric of Example 13 attained a good carding step passage rate of 96%. Furthermore, the fibers were excellently dispersed and formed no fiber clumps, thus offering high quality.

The sound-absorbing laminated nonwoven fabric obtained had a relatively high low-frequency sound absorption coefficient and a high high-frequency sound absorption coefficient, and had a small change in the b value after the treatment at 150° C. for 500 hours, thus showing good heat resistance.

Example 14

Short fibers A were 50 mass % of polyethylene terephthalate (PET) short fibers that had a fineness of 0.56 dtex, a fiber length of 3.8 cm, a strength of 5.4 cN/dtex, an elongation percentage of 23%, a number of crimps of 13.4 peaks/25 mm, a crimping degree of 15.3% and a carding passage coefficient of 55. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.39, a basis weight of 300 g/m$^2$, a thickness of 2.2 mm and a nonwoven fabric density of 0.136 g/cm$^3$.

No fibers were wasted or caught in the card clothing due to fiber breakage during the carding step, and the sound-absorbing material nonwoven fabric of Example 14 attained a good carding step passage rate of 98%. Furthermore, the fibers were excellently dispersed and formed no fiber clumps, thus offering high quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Example 15

Short fibers A were 50 mass % of polyethylene terephthalate (PET) short fibers that had a fineness of 0.57 dtex, a fiber length of 3.8 cm, a strength of 6.3 cN/dtex, an elongation percentage of 24%, a number of crimps of 13.5 peaks/25 mm, a crimping degree of 15.3% and a carding passage coefficient of 67. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.39, a basis weight of 300 g/m$^2$, a thickness of 2.2 mm and a nonwoven fabric density of 0.136 g/cm$^3$.

No fibers were wasted or caught in the card clothing due to fiber breakage during the carding step, and the sound-absorbing material nonwoven fabric of Example 15 attained a good carding step passage rate of 99%. Furthermore, the fibers were excellently dispersed and formed no fiber clumps, thus offering high quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Example 16

Short fibers A were 50 mass % of polyethylene terephthalate (PET) short fibers that had a fineness of 0.56 dtex, a fiber length of 3.8 cm, a strength of 3.2 cN/dtex, an elongation percentage of 24%, a number of crimps of 13.5 peaks/25 mm, a crimping degree of 15.2% and a carding passage coefficient of 33. Short fibers B were 50 mass % of polyethylene terephthalate (PET) short fibers that contained 2 mass % of carbon black and had a fineness of 2.20 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.25, a basis weight of 300 g/m$^2$, a thickness of 2.3 mm and a nonwoven fabric density of 0.130 g/cm$^3$.

Relatively few fibers were wasted or caught in the card clothing due to fiber breakage during the carding step, and the sound-absorbing material nonwoven fabric of Example 16 attained a relatively good carding step passage rate of 90%. Furthermore, the fibers were excellently dispersed and formed relatively few fiber clumps, thus offering relatively high quality.

The sound-absorbing laminated nonwoven fabric obtained had a relatively high low-frequency sound absorption coefficient and a high high-frequency sound absorption coefficient, and had a small change in the b value after the treatment at 150° C. for 500 hours, thus showing good heat resistance.

Example 17

Short fibers A were 50 mass % of polyethylene terephthalate (PET) short fibers that had a fineness of 0.85 dtex, a fiber length of 5.1 cm, a strength of 3.1 cN/dtex, an elongation percentage of 25%, a number of crimps of 13.3 peaks/25 mm, a crimping degree of 15.5% and a carding passage coefficient of 37. Short fibers B were 50 mass % of polyethylene terephthalate (PET) short fibers that contained 2 mass % of carbon black and had a fineness of 1.19 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.71, a basis weight of 300 g/m$^2$, a thickness of 2.3 mm and a nonwoven fabric density of 0.130 g/cm$^3$.

Relatively few fibers were wasted or caught in the card clothing due to fiber breakage during the carding step, and the sound-absorbing material nonwoven fabric of Example 17 attained a relatively good carding step passage rate of 86%. Furthermore, the fibers were excellently dispersed and formed relatively few fiber clumps, thus offering relatively high quality.

The sound-absorbing laminated nonwoven fabric obtained had a relatively high low-frequency sound absorption coefficient and a high high-frequency sound absorption coefficient, and had a small change in the b value after the treatment at 150° C. for 500 hours, thus showing good heat resistance.

Comparative Example 1

Short fibers A were 50 mass % of acrylic short fibers that had a fineness of 0.36 dtex, a fiber length of 3.8 cm, a strength of 2.8 cN/dtex, an elongation percentage of 24%, a number of crimps of 13.3 peaks/25 mm, a crimping degree of 15.7% and a carding passage coefficient of 19. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.25, a basis weight of 300 g/m$^2$, a thickness of 2.1 mm and a nonwoven fabric density of 0.143 g/cm$^3$.

Many fibers were wasted or caught in the card clothing due to fiber breakage during the carding step, and the sound-absorbing material nonwoven fabric of Comparative Example 1 had a low carding step passage rate of 78%. Furthermore, the fibers were poorly dispersed and formed many fiber clumps, thus deteriorating the quality.

The sound-absorbing laminated nonwoven fabric obtained had a low low-frequency sound absorption coefficient and a low high-frequency sound absorption coefficient, and had a small change in the b value after the treatment at 150° C. for 500 hours, thus showing good heat resistance.

Comparative Example 2

Short fibers A were 50 mass % of acrylic short fibers that had a fineness of 0.96 dtex, a fiber length of 5.1 cm, a strength of 2.9 cN/dtex, an elongation percentage of 23%, a number of crimps of 13.2 peaks/25 mm, a crimping degree of 15.5% and a carding passage coefficient of 37. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.66, a basis weight of 300 g/m$^2$, a thickness of 2.4 mm and a nonwoven fabric density of 0.125 g/cm$^3$.

No fibers were wasted or caught in the card clothing due to fiber breakage during the carding step, and the sound-absorbing material nonwoven fabric of Comparative Example 2 attained a good carding step passage rate of 98%. Furthermore, the fibers were excellently dispersed and formed no fiber clumps, thus offering high quality.

The sound-absorbing laminated nonwoven fabric obtained had a low low-frequency sound absorption coefficient and a low high-frequency sound absorption coefficient, and had a small change in the b value after the treatment at 150° C. for 500 hours, thus showing good heat resistance.

Comparative Example 3

Short fibers A were 50 mass % of acrylic short fibers that had a fineness of 0.71 dtex, a fiber length of 3.8 cm, a strength of 1.4 cN/dtex, an elongation percentage of 13%, a number of crimps of 13.0 peaks/25 mm, a crimping degree of 15.6% and a carding passage coefficient of 13. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.49, a basis weight of 300 g/m$^2$, a thickness of 2.4 mm and a nonwoven fabric density of 0.125 g/cm$^3$.

Many fibers were wasted or caught in the card clothing due to fiber breakage during the carding step, and the sound-absorbing material nonwoven fabric of Comparative Example 3 had a low carding step passage rate of 64%. Furthermore, the fibers were poorly dispersed and formed many fiber clumps, thus deteriorating the quality.

The sound-absorbing laminated nonwoven fabric obtained had a high low-frequency sound absorption coefficient and a high high-frequency sound absorption coefficient, and had a small change in the b value after the treatment at 150° C. for 500 hours, thus showing good heat resistance.

Comparative Example 4

Short fibers A were 50 mass % of acrylic short fibers that had a fineness of 0.71 dtex, a fiber length of 3.8 cm, a strength of 2.8 cN/dtex, an elongation percentage of 22%, a number of crimps of 5.0 peaks/25 mm, a crimping degree of 6.0% and a carding passage coefficient of 13. Short fibers B were 50 mass % of polyethylene terephthalate (PET) short fibers that contained 2 mass % of carbon black and had a fineness of 1.45 dtex and a fiber length of 5.1 cm. These short fibers were treated at the same steps under the same conditions as in Example 1 to give a sound-absorbing material nonwoven fabric having a fineness ratio of the short fibers A to the short fibers B of 0.49, a basis weight of 300 g/m$^2$, a thickness of 2.3 mm and a nonwoven fabric density of 0.130 g/cm$^3$.

Many fibers were wasted or caught in the card clothing due to fiber breakage during the carding step, and the sound-absorbing material nonwoven fabric of Comparative Example 4 had a low carding step passage rate of 75%. Furthermore, the fibers were poorly dispersed and formed many fiber clumps, thus deteriorating the quality.

The sound-absorbing laminated nonwoven fabric obtained had a low low-frequency sound absorption coefficient and a low high-frequency sound absorption coefficient, and had a small change in the b value after the treatment at 150° C. for 500 hours, thus showing good heat resistance.

Comparative Example 5

A sound-absorbing material nonwoven fabric having a fineness ratio of the short fibers A to the short fibers B of 0.49, a basis weight of 300 g/m$^2$, a thickness of 2.4 mm and a nonwoven fabric density of 0.125 g/cm$^3$ was obtained by the same steps under the same treatment conditions as in Example 1, except that the short fibers A were changed to 20 mass % of the acrylic short fibers used in Example 2, and the short fibers B were changed to 80 mass % of the polyethylene terephthalate (PET) short fibers used in Example 2.

No fibers were wasted or caught in the card clothing due to fiber breakage during the carding step, and the sound-absorbing material nonwoven fabric of Comparative Example 5 attained a good carding step passage rate of 98%. Furthermore, the fibers were excellently dispersed and formed no fiber clumps, thus offering high quality.

The sound-absorbing laminated nonwoven fabric obtained had a low low-frequency sound absorption coefficient and a low high-frequency sound absorption coefficient, and had a small change in the b value after the treatment at 150° C. for 500 hours, thus showing good heat resistance.

Comparative Example 6

A sound-absorbing material nonwoven fabric having a fineness ratio of the short fibers A to the short fibers B of 0.49, a basis weight of 300 g/m$^2$, a thickness of 2.3 mm and a nonwoven fabric density of 0.130 g/cm$^3$ was obtained by the same steps under the same treatment conditions as in Example 1, except that the short fibers A were changed to 90 mass % of the acrylic short fibers used in Example 2, and the short fibers B were changed to 10 mass % of the polyethylene terephthalate (PET) short fibers used in Example 2.

Many fibers were wasted or caught in the card clothing due to fiber breakage during the carding step, and the sound-absorbing material nonwoven fabric of Comparative Example 6 had a low carding step passage rate of 68%. Furthermore, the fibers were poorly dispersed and formed many fiber clumps, thus deteriorating the quality.

The sound-absorbing laminated nonwoven fabric obtained had a low low-frequency sound absorption coefficient and a low high-frequency sound absorption coefficient, and had a relatively large change in the b value after the treatment at 150° C. for 500 hours, thus showing poor heat resistance.

The configurations and characteristics of the sound-absorbing material nonwoven fabrics of Examples and Comparative Examples are described in Tables 1 to 4.

TABLE 1

| | | | Unit | Ex. 1 | Ex. 2 | Ex. 3 | Ex. 4 | Ex. 5 |
|---|---|---|---|---|---|---|---|---|
| Nonwoven fabric configurations | Short fibers A | Material | — | Acrylic | Acrylic | Acrylic | Acrylic | Acrylic |
| | | Fineness | dtex | 0.48 | 0.71 | 0.86 | 0.71 | 0.71 |
| | | Fiber length | cm | 3.8 | 3.8 | 5.1 | 3.8 | 3.8 |
| | | Strength | cN/dtex | 2.9 | 2.9 | 2.8 | 2.9 | 2.9 |
| | | Tensile elongation percentage | % | 24 | 23 | 23 | 23 | 23 |
| | | Number of crimps | peaks/25 mm | 13.1 | 13.0 | 13.1 | 13.0 | 13.0 |
| | | Crimping degree | % | 15.6 | 15.7 | 15.6 | 15.7 | 15.7 |
| | | Carding passage coefficient | — | 26 | 37 | 32 | 37 | 37 |
| | | Content | mass % | 50 | 50 | 50 | 35 | 75 |
| | Short fibers B | Material | — | PET | PET | PET | PET | PET |
| | | Fineness | dtex | 1.45 | 1.45 | 1.45 | 1.45 | 1.45 |
| | | Fiber length | cm | 5.1 | 5.1 | 5.1 | 5.1 | 5.1 |
| | | Content | mass % | 50 | 50 | 50 | 65 | 25 |
| | Fineness ratio of short fibers A to short fibers B (fineness of short fibers A/fineness of short fibers B) | | — | 0.33 | 0.49 | 0.59 | 0.49 | 0.49 |
| Carding step passage properties | Carding step passage rate | | % | 95 | 97 | 98 | 98 | 91 |
| | Number of fiber clumps | | clumps/m$^2$ | 2 | 0 | 0 | 0 | 8 |
| Properties | Basis weight | | g/m$^2$ | 300 | 300 | 300 | 300 | 300 |
| | Thickness | | mm | 2.1 | 2.3 | 2.4 | 2.4 | 2.3 |
| | Density | | g/cm$^3$ | 0.143 | 0.130 | 0.125 | 0.125 | 0.130 |
| | Pore size distribution | 5-10 μm | % | 46 | 19 | 7 | 8 | 42 |
| | | 10-15 μm | % | 30 | 44 | 53 | 48 | 31 |
| | | 15-20 μm | % | 13 | 18 | 23 | 20 | 15 |
| | Air permeability | | cm$^3$/cm$^2$/s | 8 | 15 | 22 | 21 | 10 |
| | Low-frequency sound absorption coefficient (1000 Hz) | | % | 88 | 71 | 61 | 62 | 82 |
| | High-frequency sound absorption coefficient (2000 Hz) | | % | 85 | 92 | 94 | 93 | 85 |
| | L value | | — | 52 | 50 | 51 | 43 | 70 |
| | Change in b value | | — | 3 | 3 | 3 | 1 | 4 |

TABLE 2

| | | | Unit | Ex. 6 | Ex. 7 | Ex. 8 | Ex. 9 | Ex. 10 |
|---|---|---|---|---|---|---|---|---|
| Nonwoven fabric configurations | Short fibers A | Material | — | Acrylic | Acrylic | Acrylic | Acrylic | PET |
| | | Fineness | dtex | 0.70 | 0.71 | 0.71 | 0.71 | 0.56 |
| | | Fiber length | cm | 3.8 | 3.8 | 3.8 | 3.8 | 3.8 |
| | | Strength | cN/dtex | 1.8 | 2.9 | 2.9 | 2.9 | 3.2 |
| | | Tensile elongation percentage | % | 17 | 24 | 23 | 23 | 24 |
| | | Number of crimps | peaks/25 mm | 13.0 | 8.0 | 13.0 | 13.0 | 13.5 |
| | | Crimping degree | % | 15.7 | 9.0 | 15.7 | 15.7 | 15.2 |
| | | Carding passage coefficient | — | 20 | 23 | 37 | 37 | 33 |
| | | Content | mass % | 50 | 50 | 50 | 50 | 50 |
| | Short fibers B | Material | — | PET | PET | PET | PET | PET |
| | | Fineness | dtex | 1.45 | 1.45 | 1.45 | 1.45 | 1.45 |
| | | Fiber length | cm | 5.1 | 5.1 | 5.1 | 5.1 | 5.1 |
| | | Content | mass % | 50 | 50 | 50 | 50 | 50 |
| | Fineness ratio of short fibers A to short fibers B (fineness of short fibers A/fineness of short fibers B) | | — | 0.48 | 0.49 | 0.49 | 0.49 | 0.39 |
| Carding step passage properties | Carding step passage rate | | % | 86 | 88 | 97 | 97 | 88 |
| | Number of fiber clumps | | clumps/m$^2$ | 3 | 9 | 0 | 0 | 9 |
| Properties | Basis weight | | g/m$^2$ | 300 | 300 | 140 | 300 | 300 |
| | Thickness | | mm | 2.4 | 2.4 | 1.4 | 4.5 | 2.2 |
| | Density | | g/cm$^3$ | 0.125 | 0.125 | 0.100 | 0.067 | 0.136 |
| | Pore size distribution | 5-10 μm | % | 18 | 16 | 3 | 2 | 16 |
| | | 10-15 μm | % | 46 | 47 | 31 | 32 | 38 |
| | | 15-20 μm | % | 19 | 19 | 33 | 34 | 29 |
| | Air permeability | | cm$^3$/cm$^2$/s | 17 | 18 | 29 | 29 | 17 |
| | Low-frequency sound absorption coefficient (1000 Hz) | | % | 69 | 67 | 45 | 46 | 66 |

TABLE 2-continued

| | | Unit | Ex. 6 | Ex. 7 | Ex. 8 | Ex. 9 | Ex. 10 |
|---|---|---|---|---|---|---|---|
| | High-frequency sound absorption coefficient (2000 Hz) | % | 92 | 93 | 88 | 89 | 92 |
| | L value | — | 52 | 52 | 51 | 52 | 51 |
| | Change in b value | — | 3 | 3 | 3 | 3 | 2 |

TABLE 3

| | | | Unit | Ex. 11 | Ex. 12 | Ex. 13 | Ex. 14 | Ex. 15 | Ex. 16 | Ex. 17 |
|---|---|---|---|---|---|---|---|---|---|---|
| Nonwoven fabric configu-rations | Short fibers A | Material | — | PET | PET | PET | PET | PET | PET | PET |
| | | Fineness | dtex | 0.85 | 0.56 | 0.56 | 0.56 | 0.57 | 0.56 | 0.85 |
| | | Fiber length | cm | 5.1 | 3.8 | 3.8 | 3.8 | 3.8 | 3.8 | 5.1 |
| | | Strength | cN/dtex | 3.1 | 3.2 | 3.2 | 5.4 | 6.3 | 3.2 | 3.1 |
| | | Tensile elongation percentage | % | 25 | 24 | 24 | 23 | 24 | 24 | 25 |
| | | Number of crimps | peaks/25 mm | 13.3 | 13.5 | 13.5 | 13.4 | 13.5 | 13.5 | 13.3 |
| | | Crimping degree | % | 15.5 | 15.2 | 15.2 | 15.3 | 15.3 | 15.2 | 15.5 |
| | | Carding passage coefficient | — | 37 | 33 | 33 | 55 | 67 | 33 | 37 |
| | | Content | mass % | 50 | 50 | 50 | 50 | 50 | 50 | 50 |
| | Short fibers B | Material | — | PET | PET | PET | PET | PET | PET | PET |
| | | Fineness | dtex | 1.45 | 6.61 | 19.25 | 1.45 | 1.45 | 2.20 | 1.19 |
| | | Fiber length | cm | 5.1 | 5.1 | 6.4 | 5.1 | 5.1 | 5.1 | 5.1 |
| | | Content | mass % | 50 | 50 | 50 | 50 | 50 | 50 | 50 |
| | Fineness ratio of short fibers A to short fibers B (fineness of short fibers A/fineness of short fibers B) | | — | 0.59 | 0.08 | 0.03 | 0.39 | 0.39 | 0.25 | 0.71 |
| Carding step passage properties | Carding step passage rate | | % | 89 | 94 | 96 | 98 | 99 | 90 | 86 |
| | Number of fiber clumps | | clumps/$m^2$ | 6 | 2 | 0 | 0 | 0 | 4 | 12 |
| Properties | Basis weight | | g/$m^2$ | 300 | 300 | 300 | 300 | 300 | 300 | 300 |
| | Thickness | | mm | 2.4 | 2.4 | 2.4 | 2.2 | 2.2 | 2.3 | 2.3 |
| | Density | | g/$cm^3$ | 0.125 | 0.125 | 0.125 | 0.136 | 0.136 | 0.130 | 0.130 |
| | Pore size distri-bution | 5-10 μm | % | 6 | 5 | 3 | 18 | 20 | 7 | 5 |
| | | 10-15 μm | % | 55 | 32 | 30 | 41 | 44 | 53 | 31 |
| | | 15-20 μm | % | 23 | 31 | 33 | 23 | 19 | 24 | 33 |
| | Air permeability | | $cm^3/cm^2/s$ | 22 | 23 | 28 | 16 | 15 | 21 | 23 |
| | Low-frequency sound absorption coefficient (1000 Hz) | | % | 59 | 58 | 46 | 71 | 73 | 60 | 58 |
| | High-frequency sound absorption coefficient (2000 Hz) | | % | 95 | 95 | 84 | 92 | 92 | 94 | 94 |
| | L value | | — | 52 | 49 | 48 | 51 | 50 | 50 | 49 |
| | Change in b value | | — | 2 | 2 | 2 | 2 | 2 | 2 | 2 |

TABLE 4

| | | | Unit | Comp. Ex. 1 | Ex. 2 | Comp. Ex. 3 | Comp. Ex. 4 | Comp. Ex. 5 | Comp. Ex. 6 |
|---|---|---|---|---|---|---|---|---|---|
| Nonwoven fabric configu-rations | Short fibers A | Material | — | Acrylic | Acrylic | Acrylic | Acrylic | Acrylic | Acrylic |
| | | Fineness | dtex | 0.36 | 0.96 | 0.71 | 0.71 | 0.71 | 0.71 |
| | | Fiber length | cm | 3.8 | 5.1 | 3.8 | 3.8 | 3.8 | 3.8 |
| | | Strength | cN/dtex | 2.8 | 2.9 | 1.4 | 2.8 | 2.9 | 2.9 |
| | | Tensile elongation percentage | % | 24 | 23 | 13 | 22 | 23 | 23 |
| | | Number of crimps | peaks/25 mm | 13.3 | 13.2 | 13.0 | 5.0 | 13.0 | 13.0 |
| | | Crimping degree | % | 15.7 | 15.5 | 15.6 | 6.0 | 15.7 | 15.7 |
| | | Carding passage coefficient | — | 19 | 37 | 13 | 13 | 37 | 37 |
| | | Content | mass % | 50 | 50 | 50 | 50 | 20 | 90 |
| | Short fibers B | Material | — | PET | PET | PET | PET | PET | PET |
| | | Fineness | dtex | 1.45 | 1.45 | 1.45 | 1.45 | 1.45 | 1.45 |
| | | Fiber length | cm | 5.1 | 5.1 | 5.1 | 5.1 | 5.1 | 5.1 |
| | | Content | mass % | 50 | 50 | 50 | 50 | 80 | 10 |
| | Fineness ratio of short fibers A to short fibers B (fineness of short fibers A/fineness of short fibers B) | | — | 0.25 | 0.66 | 0.49 | 0.49 | 0.49 | 0.49 |
| Carding step passage properties | Carding step passage rate | | % | 78 | 98 | 64 | 75 | 98 | 68 |
| | Number of fiber clumps | | clumps/$m^2$ | 94 | 0 | 18 | 87 | 0 | 76 |

TABLE 4-continued

| | | | Unit | Comp. Ex. 1 | Ex. 2 | Comp. Ex. 3 | Comp. Ex. 4 | Comp. Ex. 5 | Comp. Ex. 6 |
|---|---|---|---|---|---|---|---|---|---|
| Properties | Basis weight | | $g/m^2$ | 300 | 300 | 300 | 300 | 300 | 300 |
| | Thickness | | mm | 2.1 | 2.4 | 2.4 | 2.3 | 2.4 | 2.3 |
| | Density | | $g/cm^3$ | 0.143 | 0.125 | 0.125 | 0.130 | 0.125 | 0.130 |
| | Pore size | 5-10 μm | % | 1 | 0 | 8 | 1 | 0 | 1 |
| | distri- | 10-15 μm | % | 32 | 35 | 49 | 33 | 36 | 35 |
| | bution | 15-20 μm | % | 40 | 44 | 22 | 39 | 47 | 48 |
| | Air permeability | | $cm^3/cm^2/s$ | 36 | 37 | 22 | 37 | 38 | 36 |
| | Low-frequency sound absorption coefficient (1000 Hz) | | % | 39 | 38 | 62 | 38 | 36 | 39 |
| | High-frequency sound absorption coefficient (2000 Hz) | | % | 79 | 77 | 95 | 79 | 70 | 78 |
| | L value | | — | 51 | 52 | 52 | 51 | 38 | 78 |
| | Change in b value | | — | 3 | 3 | 3 | 3 | 1 | 7 |

The sound-absorbing material nonwoven fabrics according to embodiments of the present invention are excellent in sound absorption performance in a low frequency region and a high frequency region, and are excellent in productivity and also in quality, thus being suitably used particularly as sound-absorbing materials for automobiles and the like.

The invention claimed is:

1. A sound-absorbing material nonwoven fabric comprising:

30 to 80 mass % of short fibers A having a fineness of 0.4 to 0.9 dtex; and 20 to 70 mass % of short fibers B having a fineness of 1.1 to 20.0 dtex, a carding passage coefficient of the short fibers A calculated from following equation (1) being in a range of 15 to 260, $$\text{carding passage coefficient} = \frac{\left(\text{fineness} \times \text{strength} \times \sqrt[2]{\text{elongation percentage} \times \text{number of crimps} \times \text{crimping degree}}\right)}{(\text{fiber length})} \quad (1)$$

wherein fineness, strength, elongation percentage, number of crimps, crimping degree, and fiber length in the equation (1) are measured in the units of dtex, cN/dtex, %, peaks/25 mm, %, and cm, respectively.

2. The sound-absorbing material nonwoven fabric according to claim 1, wherein a basis weight of the sound-absorbing material nonwoven fabric is not less than 150 $g/m^2$ and not more than 500 $g/m^2$, and a thickness of the sound-absorbing material nonwoven fabric is not less than 0.6 mm and not more than 4.0 mm.

3. The sound-absorbing material nonwoven fabric according to claim 1, wherein a density of the sound-absorbing material nonwoven fabric is not less than 0.07 $g/cm^3$ and not more than 0.40 $g/cm^3$.

4. The sound-absorbing material nonwoven fabric according to claim 1, wherein the short fibers A are acrylic short fibers or polyester short fibers.

5. The sound-absorbing material nonwoven fabric according to claim 1, wherein the short fibers A are acrylic short fibers.

6. The sound-absorbing material nonwoven fabric according to claim 1, wherein a L value in the L*a*b* color system is not more than 70.

7. The sound-absorbing material nonwoven fabric according to claim 1, wherein a tensile strength of the short fibers A is not less than 5 cN/dtex, and a tensile elongation percentage of the short fibers A is 20 to 35%.

8. The sound-absorbing material nonwoven fabric according to claim 1, wherein the fineness of the short fibers A is 0.4 to 0.9 dtex, the fineness of the short fibers B is 1.1 to 1.8 dtex, and a ratio of the fineness of the short fibers A to the fineness of the short fibers B is 0.30 to 0.60.

9. A sound-absorbing material comprising:

the sound-absorbing material nonwoven fabric according to claim 1; and a fiber porous body, a foam, or an air layer having a thickness of 5 to 50 mm and disposed on a side of the sound-absorbing material nonwoven fabric opposite to a side on which sound enters.

10. A method for producing a sound-absorbing material nonwoven fabric, the method comprising:

a step of opening short fibers A and short fibers B and obtaining a mixed fiber web comprising the short fibers A and the short fibers B; and a step of passing the mixed fiber web through a water jet punching nozzle three or more times, the short fibers A having a fineness of 0.4 to 0.9 dtex and a carding passage coefficient calculated from equation (1) below in a range of 15 to 260, the short fibers B having a fineness of 1.1 to 20.0 dtex, a content of the short fibers A being 30 to 80 mass % and a content of the short fibers B being 20 to 70 mass % of the whole of the mixed fiber web, $$\text{carding passage coefficient} = \frac{\left(\text{fineness} \times \text{strength} \times \sqrt[2]{\text{elongation percentage} \times \text{number of crimps} \times \text{crimping degree}}\right)}{(\text{fiber length})} \quad (1)$$

wherein fineness, strength, elongation percentage, number of crimps, crimping degree, and fiber length in the equation (1) are measured in the units of dtex, cN/dtex, %, peaks/25 mm, %, and cm, respectively.

11. A method for producing a sound-absorbing material nonwoven fabric, the method comprising:

a step of opening short fibers A and short fibers B and obtaining a mixed fiber web comprising the short fibers A and the short fibers B; and a step of needle punching the mixed fiber web with a needle density of not less than 200 needles/cm$^2$, the short fibers A having a fineness of 0.4 to 0.9 dtex and a carding passage coefficient calculated from equation (1) below in a range of 15 to 260, the short fibers B having a fineness of 1.1 to 20.0 dtex, a content of the short fibers A being 30 to 80 mass % and a content of the short fibers B being 20 to 70 mass % of the whole of the mixed fiber web, $$\text{carding passage coefficient} = \frac{\left(\text{fineness} \times \text{strength} \times \sqrt[2]{\text{elongation percentage} \times \text{number of crimps} \times \text{crimping degree}}\right)}{(\text{fiber length})} \quad (1)$$

wherein fineness, strength, elongation percentage, number of crimps, crimping degree, and fiber length in the equation (1) are measured in the units of dtex, cN/dtex, %, peaks/25 mm, %, and cm, respectively.

* * * * *